(12) United States Patent
Uno

(10) Patent No.: US 9,304,279 B2
(45) Date of Patent: Apr. 5, 2016

(54) LENS BARREL

(71) Applicant: Panasonic Corporation, Osaka (JP)

(72) Inventor: Tetsuya Uno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/164,649

(22) Filed: Jan. 27, 2014

(65) Prior Publication Data

US 2014/0211318 A1 Jul. 31, 2014

(30) Foreign Application Priority Data

Jan. 28, 2013 (JP) ................................. 2013-012840

(51) Int. Cl.
| | |
|---|---|
| *G02B 23/16* | (2006.01) |
| *G02B 7/02* | (2006.01) |
| *G03B 5/02* | (2006.01) |
| *G02B 5/00* | (2006.01) |
| *G02B 27/00* | (2006.01) |

(52) U.S. Cl.
CPC *G02B 7/02* (2013.01); *G02B 5/005* (2013.01); *G02B 27/0018* (2013.01)

(58) Field of Classification Search
CPC ........ G03B 11/04; G03B 17/12; G03B 23/16; G03B 7/02; G03B 5/005; G03B 27/0018
USPC .................................. 359/611, 826, 827, 830
See application file for complete search history.

(56) References Cited

U.S. PATENT DOCUMENTS

| | | | |
|---|---|---|---|
| 6,024,457 A | 2/2000 | Kawai et al. | |
| 7,373,082 B2 | 5/2008 | Yamazaki et al. | |
| 7,625,140 B2 * | 12/2009 | Miya ...................... | G03B 17/04 359/601 |
| 7,872,810 B2 | 1/2011 | Nomura et al. | |
| 8,213,094 B2 | 7/2012 | Hirabayashi | |
| 8,300,324 B2 | 10/2012 | Hirabayashi | |
| 8,432,477 B2 | 4/2013 | Honsho et al. | |
| 2006/0034595 A1 | 2/2006 | Yamazaki et al. | |
| 2009/0225460 A1 | 9/2009 | Nomura et al. | |
| 2011/0001872 A1 | 1/2011 | Honsho et al. | |
| 2011/0019291 A1 | 1/2011 | Hirabayashi | |
| 2011/0026146 A1 | 2/2011 | Hirabayashi | |
| 2012/0140330 A1 | 6/2012 | Nakayama et al. | |
| 2013/0215316 A1 | 8/2013 | Honsho et al. | |

FOREIGN PATENT DOCUMENTS

| | | |
|---|---|---|
| JP | 6-273651 A | 9/1994 |
| JP | 2001-100072 A | 4/2001 |

(Continued)

*Primary Examiner* — William Choi
(74) *Attorney, Agent, or Firm* — Renner, Otto, Boisselle & Sklar, LLP

(57) ABSTRACT

A lens barrel includes a rectilinear unit, a lens unit, and a light shielding member. The lens unit is arranged inside the rectilinear unit and is movable relative to the rectilinear unit in an optical axis direction. The light shielding member functions for light shielding between the rectilinear unit and the lens unit. The light shielding unit has a light shielding layer and a support layer. The shielding layer is fitted on a decoration frame of the lens unit and closes a gap defined between the rectilinear unit and the lens unit and extending in the optical axis direction. The support layer has a body bonded to the light shielding area. The body has at least one low rigidity portion. The low rigidity portion has rigidity lower than that of the body.

14 Claims, 13 Drawing Sheets

(56) References Cited

FOREIGN PATENT DOCUMENTS

| | | |
|---|---|---|
| JP | 2003-035860 A | 2/2003 |
| JP | 2003-140016 A | 5/2003 |
| JP | 2006-079070 A | 3/2006 |
| JP | 2007-183685 A | 7/2007 |
| JP | 2008-191621 A | 8/2008 |
| JP | 2009-210961 A | 9/2009 |
| JP | 2011-013613 A | 1/2011 |
| JP | 2012-118343 A | 1/2011 |
| JP | 2011-048348 A | 3/2011 |
| JP | 2011-048349 A | 3/2011 |
| JP | 2011-145373 A | 7/2011 |
| JP | 2012-032430 A | 2/2012 |

* cited by examiner

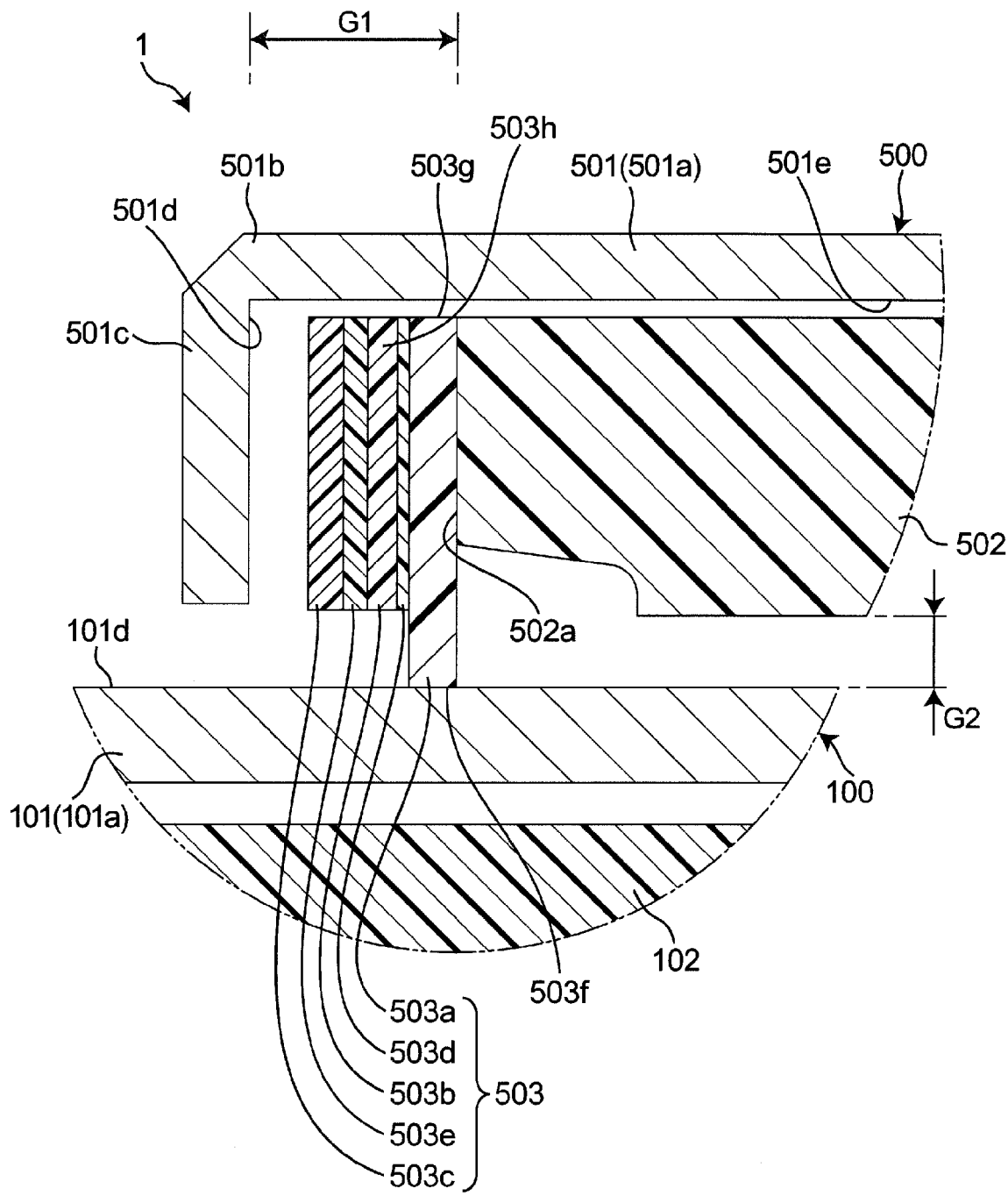

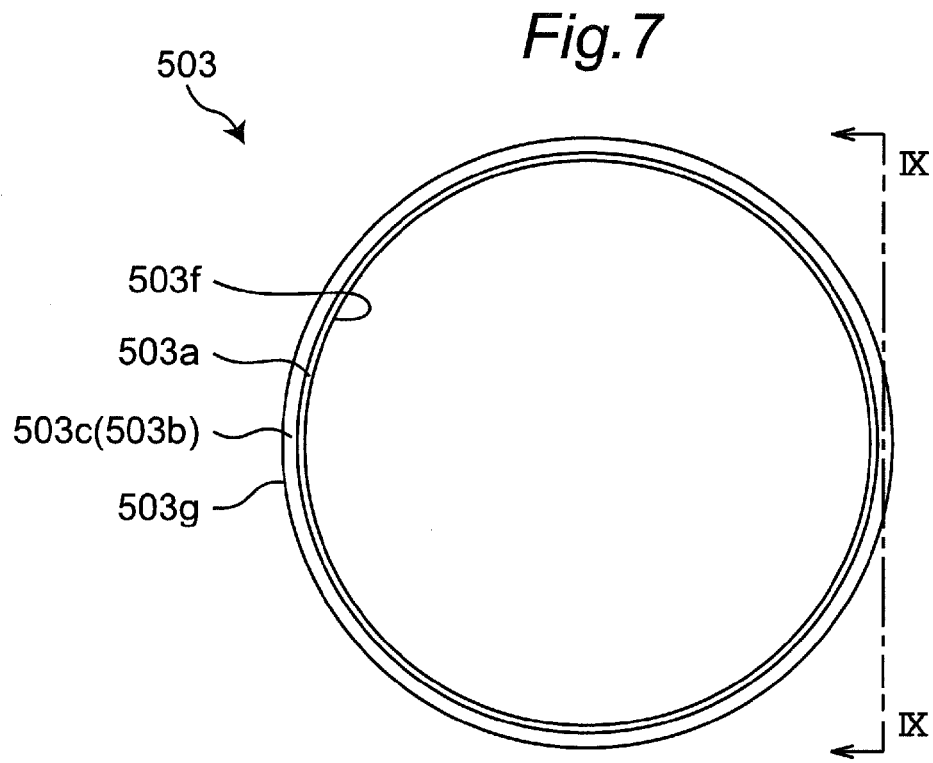
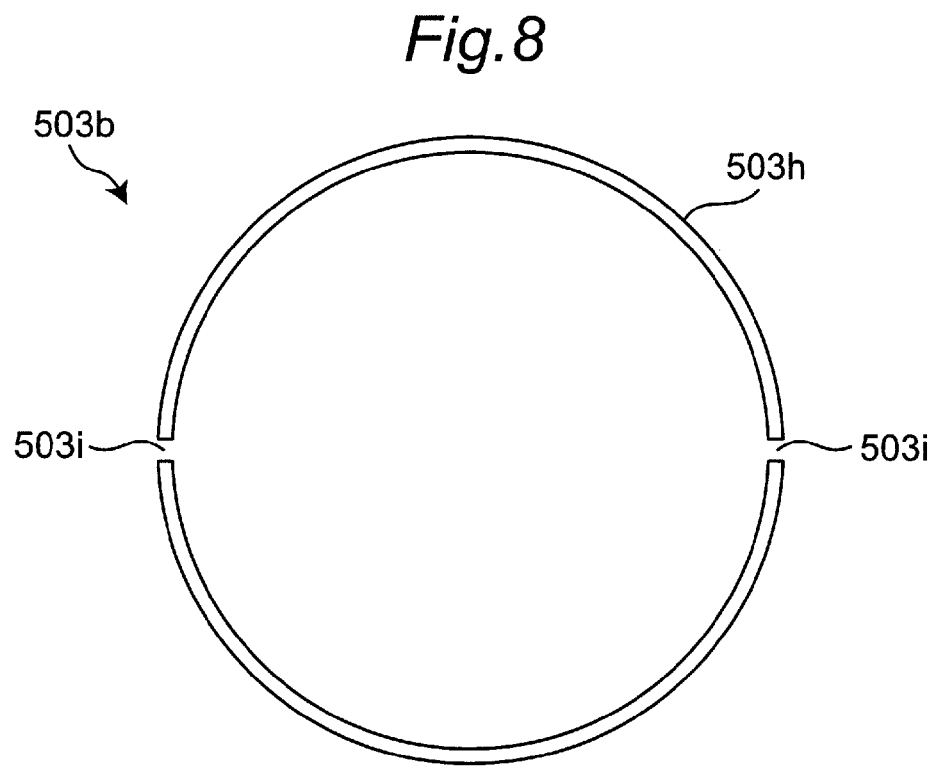

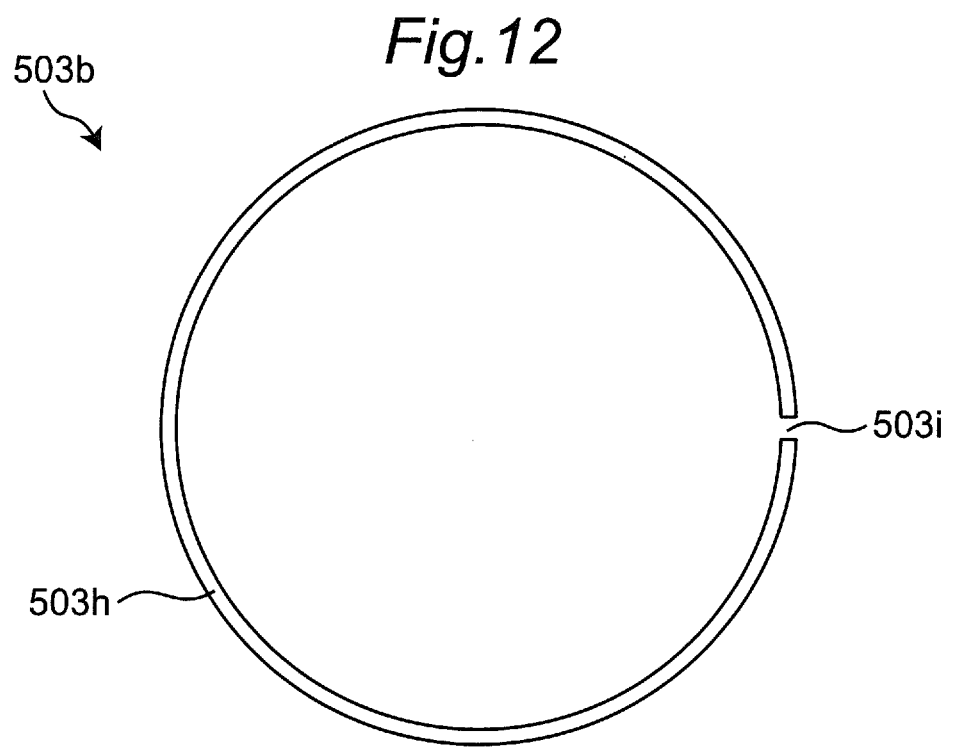
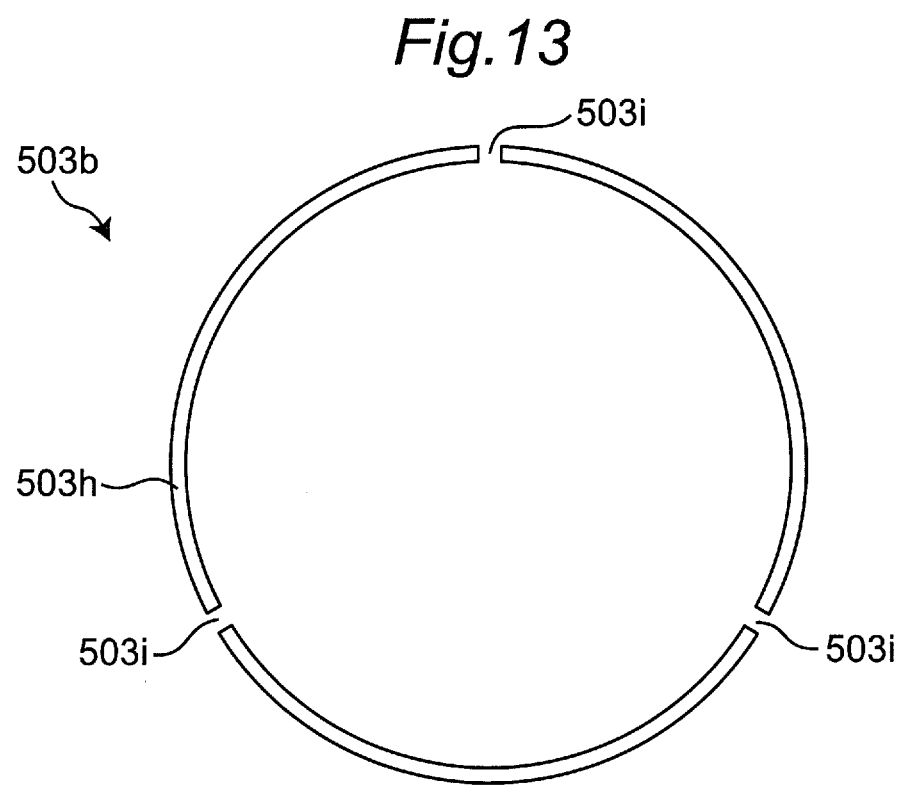

LENS BARREL

CROSS-REFERENCE TO RELATED APPLICATIONS

This application claims priority of Japanese Patent Application No.: 2013-012840 filed on Jan. 28, 2013, the content of which is incorporated herein by reference.

BACKGROUND

1. Technical Field

The present invention relates to a lens barrel.

2. Description of Related Art

JP 2011-13613 A discloses a lens instrument provided with a lens barrel capable of being extended in three stages.

SUMMARY

It is an object of the present disclosure to provide a lens barrel having further improved quality. For example, the present disclosure relates to a technique of blocking the entrance of harmful light into the lens barrel through a gap formed between members which constitute the lens barrel.

The present disclosure provides a lens barrel comprising, a first barrel portion, a second barrel portion which is arranged inside the first barrel portion and is movable in an optical axis direction relative to the first barrel portion, and a light shielding member for light shielding between the first barrel portion and the second barrel portion, wherein the light shielding member comprises a light shielding layer with an endless ring shape which is slidably fitted on the second barrel portion and closes a gap defined between the first barrel portion and the second barrel portion and extending in a direction orthogonal to the optical axis direction, and a support layer including a body with endless-ring shape bonded to the light shielding layer and at least one low rigidity portion having rigidity lower than that of the body.

BRIEF DESCRIPTION OF THE DRAWINGS

FIG. 6 is an enlarged view of an area VI in FIG. 5;

FIG. 7 is a front view of a light shielding member;

FIG. 8 is a front view of a support layer;

FIG. 12 is a front view of a first alternative of the support layer;

FIG. 13 is a front view of a second alternative of the support layer;

DETAILED DESCRIPTION

Hereinafter, an exemplary embodiment is explained in conjunction with drawings.

FIGS. 1 to 5 show a lens barrel 1 according to an embodiment. The lens barrel 1 is preferably used in digital cameras. However, this disclosure is not limited to the digital cameras and is also applicable to a lens barrel used in various imaging devices including film cameras and video cameras.

[1. Schematic constitution of lens barrel 1]

Figure 4:
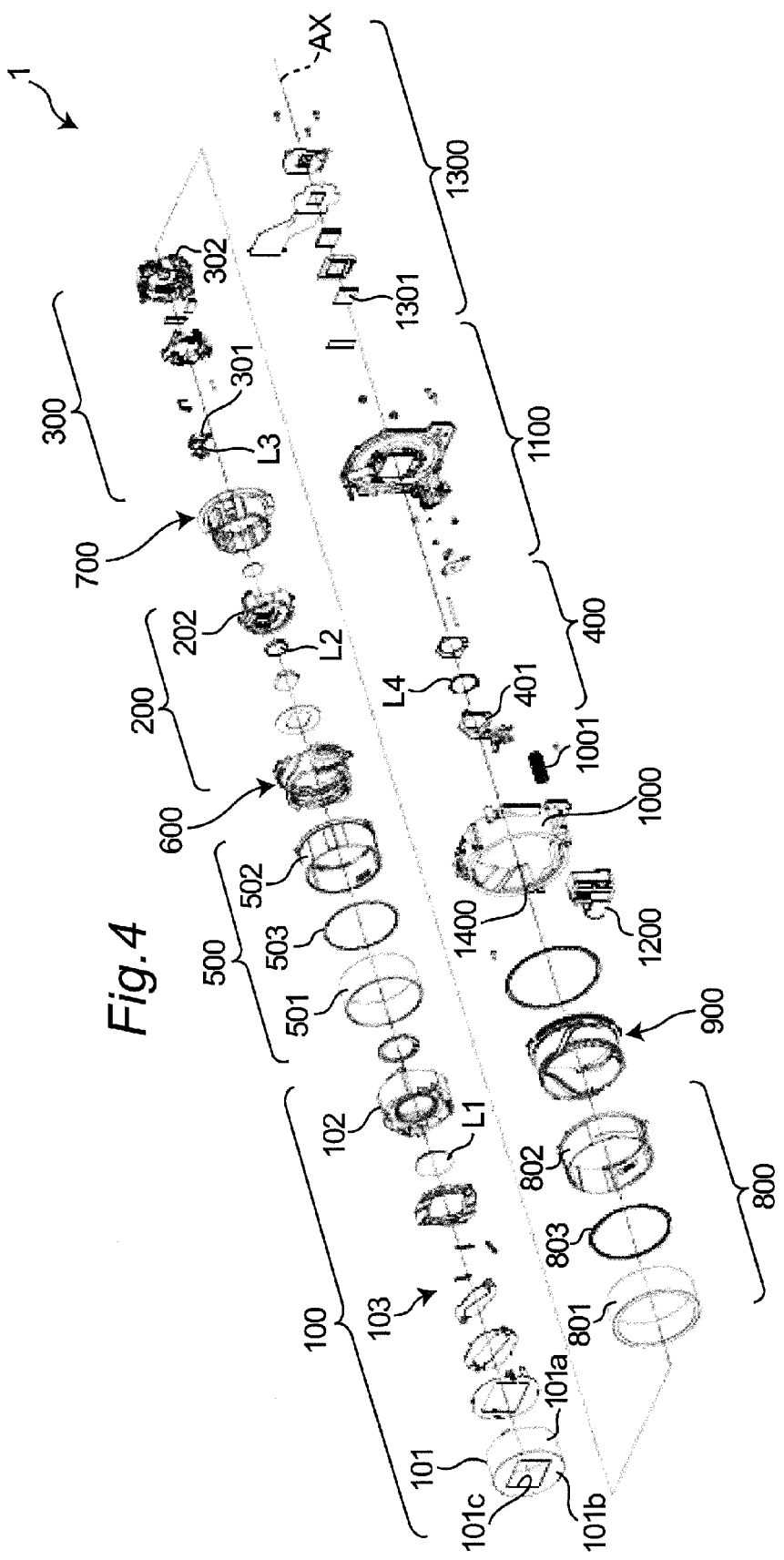
FIG. 4 is an exploded perspective view of the lens barrel.

As shown in FIG. 4, the lens barrel 1 includes a first lens unit 100, a second lens unit 200, a third lens unit 300, a fourth lens unit 400, a first rectilinear unit 500, a cam barrel 600, a second rectilinear frame 700, a second rectilinear unit 800, a drive frame 900, a fixing frame 1000, a master flange unit 1100, a zoom unit 1200, a focusing unit 1400, and an imaging element unit 1300, and a focusing unit 1400. Axes of these parts are substantially aligned with an optical axis AX.

In the following explanation, a direction parallel to the optical axis AX is referred to as an optical axis direction and a direction perpendicular to the optical axis AX is referred to as a radial direction. A direction along a circle about the optical axis AX is referred to as a circumferential direction. Further, a side where an object to be imaged is arranged in the optical axis direction is referred to as a front side or a front surface side, and an anti-side opposite to the side where the object to be imaged is arranged in the optical axis direction (an imaging element 1301 side) is referred to as a rear side or a back surface side. A term "cam mechanism" means a structure where one element of two relevant elements includes a cam and the other element includes a cam follower. A term "bayonet mechanism" means the structure where two relevant elements are connected to each other in a state where the elements are rotatable relative to each other but are not linearly movable relative to each other. A term "rectilinear mechanism" means the structure where two relevant elements are connected to each other in a state where the elements are linearly movable relative to each other but are not rotatable relative to each other.

The first lens unit 100 includes a first group lens frame 102 and a first decoration frame 101 both of which have a cylindrical shape. The first group lens frame 102 holds a first lens group L1 which is positioned on a side closest to the object to be imaged. The first decoration frame 101 includes a cylindrical portion 101a and an end portion 101b which closes a front side of the cylindrical portion 101a. An aperture portion 101c which allows an effective light to pass therethrough is formed on the end portion 101b. The first decoration frame 101 is fixed to the first group lens frame 102 in a state where the first decoration frame 101 covers the first group lens frame 102.

The second lens unit 200 includes a second group lens frame 202 which holds a second lens group L2 for zooming.

The third lens unit 300 includes a third group lens frame 301 and a shutter frame 302. The third group lens frame 301 holds a third lens group L3 for correction. The third group lens frame 301 moves in the radial direction between a position where the third lens group L3 is arranged on the optical axis AX and a position where the third lens group L3 is retracted from the optical axis AX. The shutter frame 302 incorporates a shutter mechanism therein.

The fourth lens unit 400 includes a fourth group lens frame 401 which holds a fourth lens group L4 for focusing. The fourth group lens frame 401 is driven by the focusing unit 1400 and moves in the optical axis direction.

The first rectilinear unit 500 includes a first rectilinear frame 502 and a second decoration frame 501 both of which are formed in a cylindrical shape with substantially opened both ends. The second decoration frame 501 is fixed to the first rectilinear frame 502 in a state where the second decoration frame 501 covers a radially outer side of the first rectilinear frame 502. Further, the first rectilinear unit 500 includes a light shielding member 503 described in detail later.

The second rectilinear unit 800 includes a third rectilinear frame 802 and a third decoration frame 801. The third decoration frame 801 is fixed to the third rectilinear frame 802 in a state where the third decoration frame 801 covers a radially outer side of the third rectilinear frame 802. Further, the second rectilinear unit 800 includes a light shielding member 803.

The master flange unit 1100 is fixed to a back surface of the fixing frame 1000. The imaging element unit 1300 is fixed to a back surface of the master flange unit 1100. The imaging element unit 1300 includes a CCD-type or a COMS-type imaging element 1301 for example.

The second rectilinear unit 800 is arranged inside the fixing frame 1000 in the radial direction. The drive frame 900 is arranged inside the second rectilinear unit 800 in the radial direction. The drive frame 900 is rotatably driven in the circumferential direction by the zoom unit 1200 via a gear 1001. A cam mechanism is provided between the drive frame 900 and the fixing frame 1000. Accordingly, the drive frame 900 moves rectilinearly in the optical axis direction while being rotated in the circumferential direction due to a drive force of the zoom unit 1200. The third rectilinear frame 802 of the second rectilinear unit 800 is connected to the drive frame 900 by a bayonet mechanism. A rectilinear mechanism is provided between the third rectilinear frame 802 and the fixing frame 1000. Accordingly, the second rectilinear unit 800 moves rectilinearly together with the drive frame 900 but does not rotate in the circumferential direction.

The first rectilinear unit 500 is arranged inside the second rectilinear unit 800 in the radial direction. The cam barrel 600 is arranged inside the first rectilinear unit 500 in the radial direction. The second rectilinear frame 700 is arranged inside the cam barrel 600 in the radial direction. The second lens unit 200 and the third lens unit 300 are arranged inside the second rectilinear frame 700 in the radial direction.

A cam mechanism is provided between the first rectilinear frame 502 of the first rectilinear unit 500 and the drive frame 900. Further, a rectilinear mechanism is provided between the first rectilinear frame 502 and the third rectilinear frame 802 of the second rectilinear unit 800. Accordingly, the first rectilinear frame 502 moves rectilinearly in the optical axis direction along with the rotation of the drive frame 900 but does not rotate in the circumferential direction.

A rectilinear mechanism is provided between the cam barrel 600 and the drive frame 900. The cam barrel 600 is connected to the first rectilinear frame 502 of the first rectilinear unit 500 by a bayonet mechanism. Accordingly, the cam barrel 600 moves rectilinearly in the optical axis direction together with the first rectilinear frame 502 while rotating in the circumferential direction together with the drive frame 900.

A rectilinear mechanism is provided between the second rectilinear frame 700 and the first rectilinear frame 502 of the first rectilinear unit 500. The second rectilinear frame 700 is connected to the cam barrel 600 by a bayonet mechanism. Accordingly, the second rectilinear frame 700 moves rectilinearly in the optical axis direction together with the first rectilinear frame 502 but does not rotate in the circumferential direction.

A rectilinear mechanism is provided between the second lens frame 202 of the second lens unit 200 and the second rectilinear frame 700. A cam mechanism is provided between the second group lens frame 202 and the cam barrel 600. Accordingly, the second lens unit 200 moves rectilinearly in the optical axis direction along with the rotation of the cam barrel 600 but does not rotate in the circumferential direction.

A rectilinear mechanism is provided between the shutter frame 302 of the third lens unit 300 and the second rectilinear frame 700. A cam mechanism is provided between the shutter frame 302 and the cam barrel 600. Accordingly, the shutter frame 302 moves rectilinearly in the optical axis direction along with the rotation of the cam barrel 600 but does not rotate in the circumferential direction.

The first lens unit 100 is arranged inside the first rectilinear unit 500 in the radial direction. A rectilinear mechanism is provided between the first group lens frame 102 of the first lens unit 100 and the first rectilinear frame 502 of the first rectilinear unit 500. A cam mechanism is provided between the first group lens frame 102 and the cam barrel 600. Accordingly, the first lens unit 100 moves rectilinearly in the optical axis direction along with the rotation of the cam barrel 600 but does not rotate in the circumferential direction.

Figure 1:
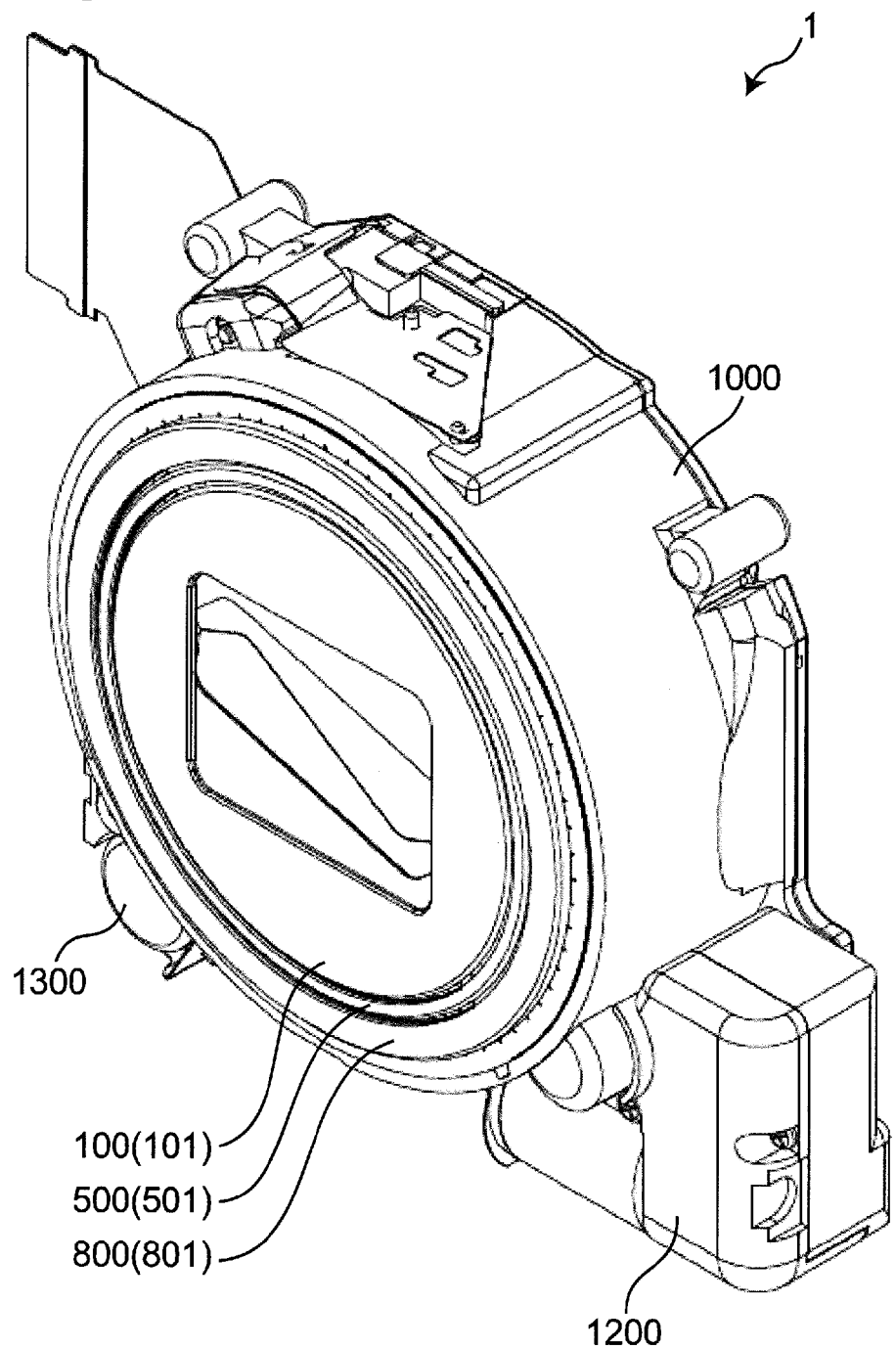
FIG. 1 is a perspective view of a lens barrel in a stored state.
Figure 2:
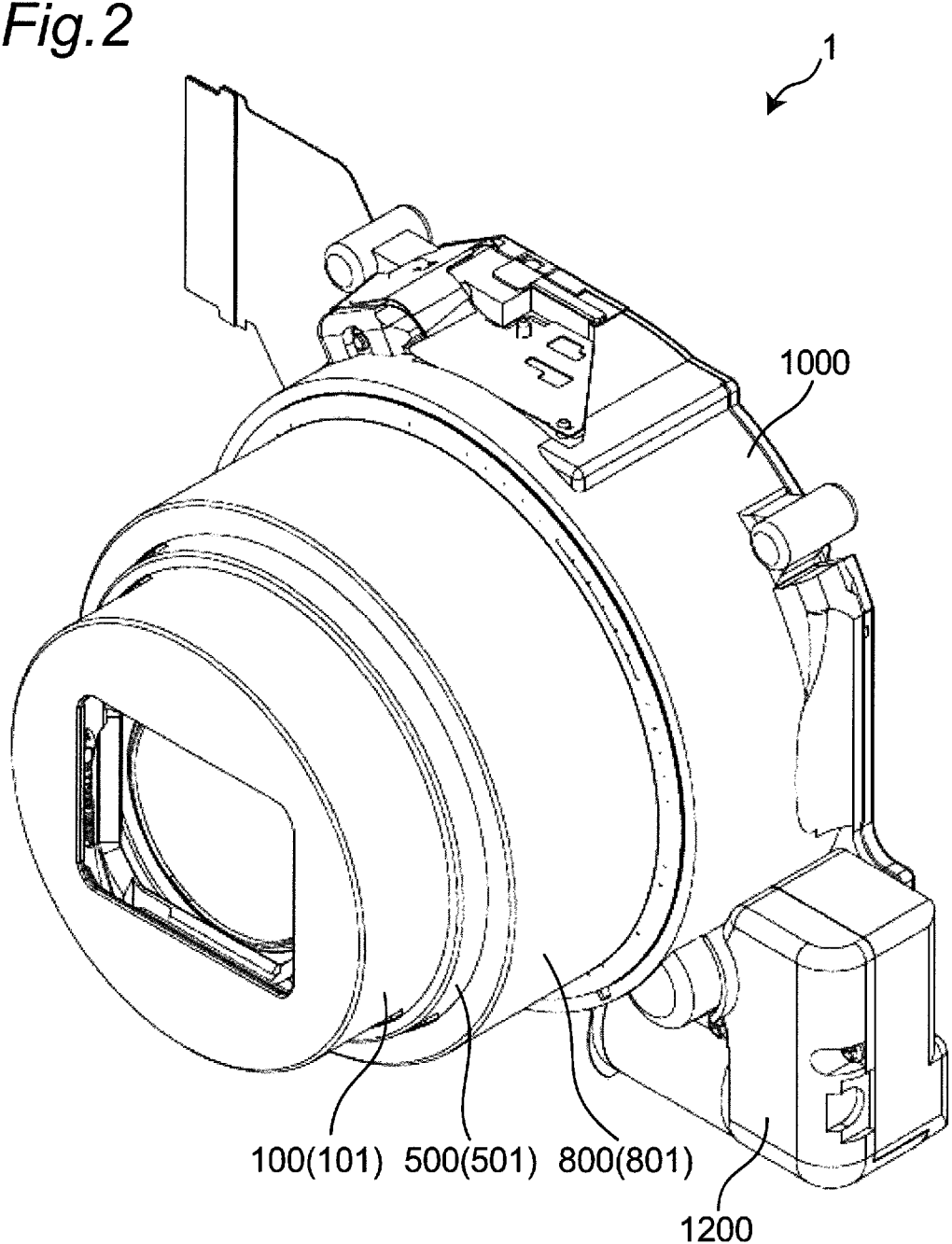
FIG. 2 is a perspective view of the lens barrel in a wide angle state.
Figure 3:
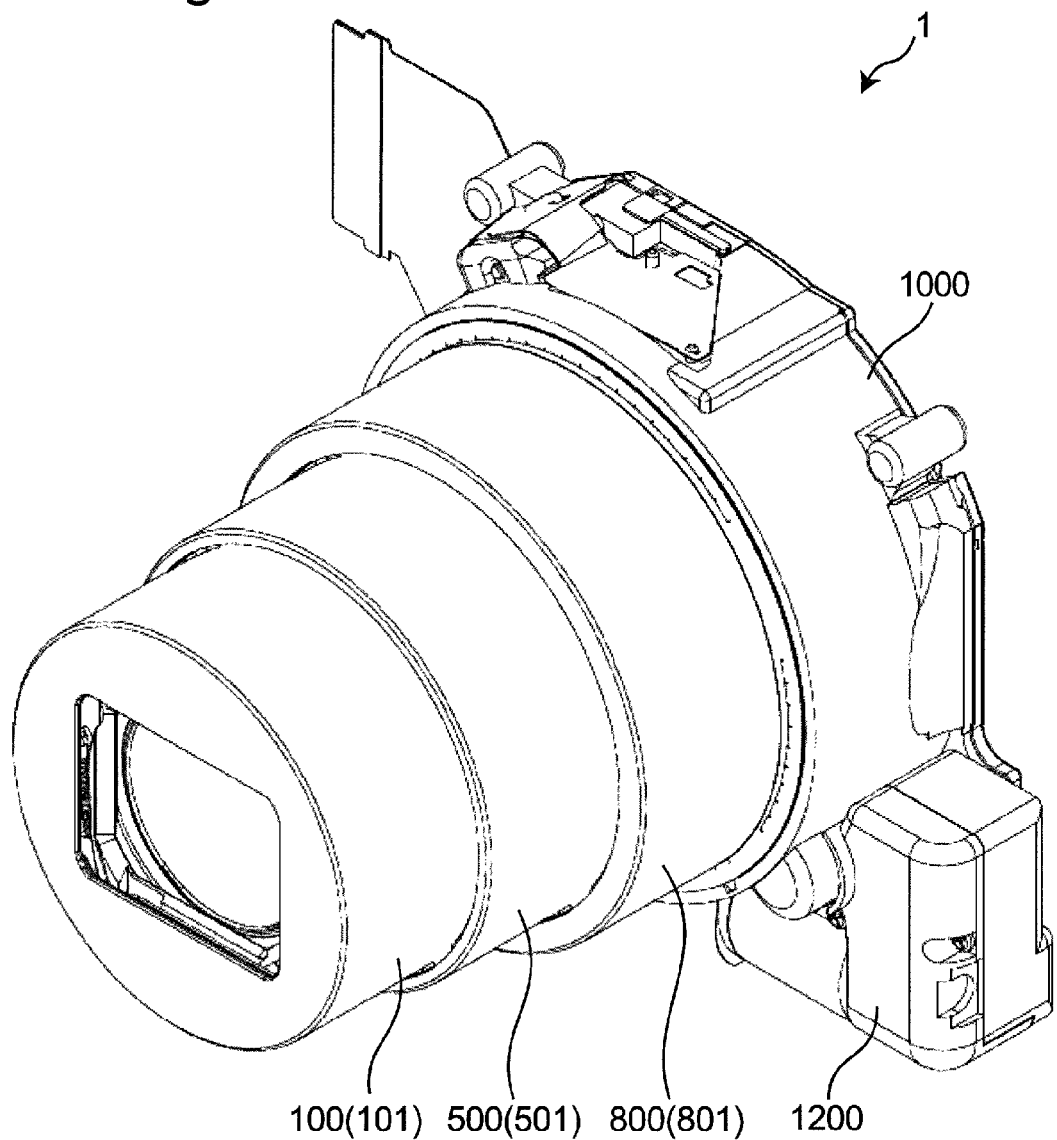
FIG. 3 is a perspective view of the lens barrel in a telescopic state.

With reference to FIGS. 1 to 3, the first lens unit 100, the first rectilinear unit 500 and the second rectilinear unit 800 are extended in the optical axis direction in three stages from the fixing frame 1000.

Figure 5:
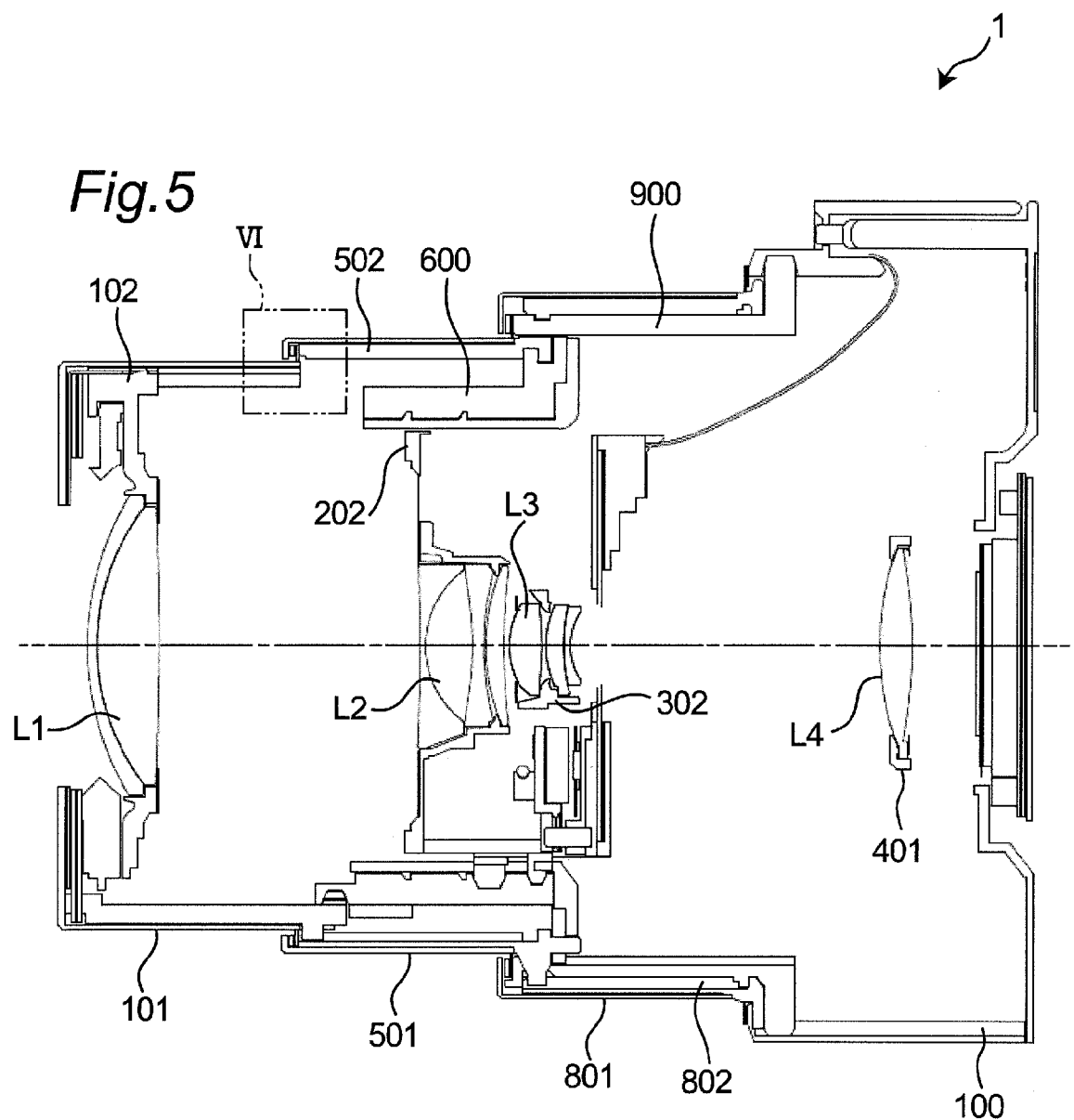
FIG. 5 is a cross-sectional view of the lens barrel in the telescopic state.

FIG. 1 shows a collapsed state (accommodated state) of the lens barrel 1. Due to the engagement of the constitutional parts, a state of the lens barrel 1 is changed to a wide angle state shown in FIG. 2 from a state shown in FIG. 1. Further, a state of the lens barrel 1 is changed to a telescopic state shown in FIG. 3 from a state shown in FIG. 2 corresponding to the engagement relationship of the constitutional parts. FIG. 5 also shows the lens barrel 1 in a telescopic state.

[2. First Lens Unit, First Rectilinear Unit, and Light Shielding Member]

With reference to FIG. 6, as described previously, the first lens unit (second cylindrical portion) 100 is arranged inside the first rectilinear unit (first cylindrical portion) 500 in the radial direction.

In the first lens unit 100, the first decoration frame (second outer frame) 101 is fixed to the first group lens frame (second cylindrical frame) 102. With further reference to FIG. 4, the cylindrical portion 101a of the first decoration frame 101 is arranged outside the first group lens frame 102 in the radial direction and surrounds the first group lens frame 102 so as to form a gap between the first group lens frame 102 and the first decoration frame 101. The end portion 101b of the first decoration frame 101 is positioned in front of the first group lens frame 102 in the optical axis direction. A mechanism 103 (shown in FIG. 4) for opening and closing the aperture portion 101c of the first decoration frame is provided in a space defined between the first group lens frame 102 and the end portion 101b of the first decoration frame 101.

In the first rectilinear unit 500, the second decoration frame (first outer frame) 501 is fixed to the first rectilinear frame (first cylindrical frame) 502. The second decoration frame 501 includes a cylindrical portion (cylindrical body) 501a with opened both ends. An end portion 501b of the cylindrical portion 501a on a front side in the optical axis direction is positioned in front of an end portion 502a of the first rectilinear frame 502 on a front side in the optical axis direction. An inwardly directed flange portion 501c inwardly projects toward the first decoration frame 101 of the first lens unit 100 from the end portion 501b of the cylindrical portion 501a on a front side in the optical axis direction. The cylindrical portion 501a of the second decoration frame 501 is arranged outside the first rectilinear frame 502 in the radial direction and surrounds the first rectilinear frame 502 so as to form a gap between the first rectilinear frame 502 and the second decoration frame 501. Further, a gap G1 extending in the optical axis direction is formed between the inwardly directed flange portion 501c of the second decoration frame 501 and the end portion 502a of the first rectilinear frame 502.

A gap G2 extending in the radial direction is formed between an inner peripheral side of the first rectilinear unit 500 and an outer peripheral side of the first lens unit 100 such that the first lens unit 100 can move rectilinearly (advance and retract) in the optical axis direction relative to the first rectilinear unit 500. The gap G2 has an endless ring shape having an approximately fixed width as viewed in the optical axis direction. As shown in FIG. 6, in order to prevent or suppress the incidence of an external light (harmful light) into the inside of the lens barrel 1 from the gap G2, the first rectilinear unit 500 includes a light shielding member 503.

Figure 9:
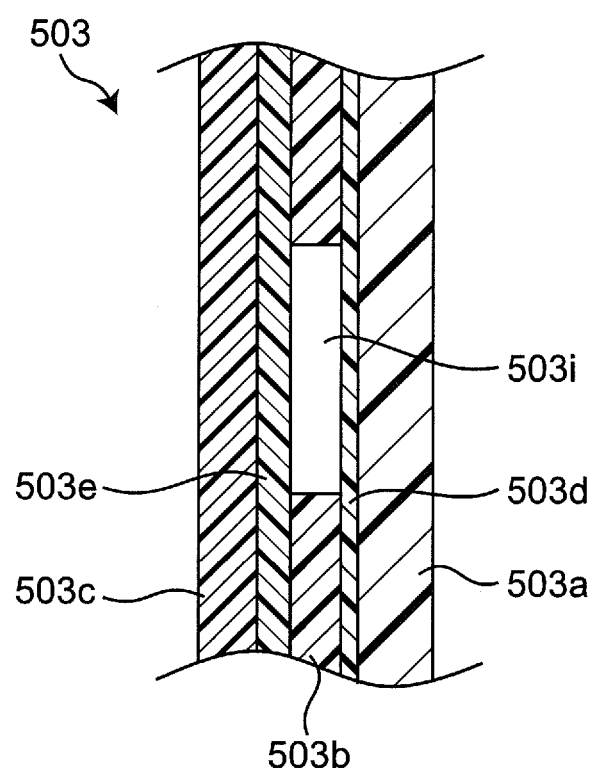
FIG. 9 is an enlarged cross-sectional view taken along a line IX-IX in FIG. 7.

With further reference to FIGS. 7 and 9, the light shielding member 503 has an endless ring shape having an approximately fixed width. A thickness (a size in the optical axis direction) of the light shielding member 503 is set sufficiently smaller than a width (a size in the radial direction) of the light shielding member 503. In other words, the light shielding member 503 has an endless ring shape having a small thickness.

As shown in FIG. 6, the light shielding member 503 is arranged in a state where the light shielding member 503 surrounds an outer peripheral surface 101d of the first decoration frame 101 of the first lens unit 100. Further, the light shielding member 503 is arranged in the gap G1 extending in the optical axis direction between the inwardly directed flange portion 501c of the second decoration frame 501 and the first rectilinear frame 502. Further, the light shielding member 503 is arranged between a rear surface 501d of the inwardly directed flange portion 501c of the second decoration frame 501 and the end portion 502a of the first rectilinear frame 502 on a front side in the optical axis direction.

The light shielding member 503 of this embodiment includes a light shielding layer 503a, a support layer 503b, and a buffer layer 503c. The light shielding layer 503a, the support layer 503b, and the buffer layer 503c are arranged in this order in the direction toward a front side in the optical axis direction from the end portion 502a of the first rectilinear frame 502 on the front side in the optical axis direction. Accordingly, the light shielding layer 503a positioned on a rearmost side in the optical axis direction oppositely faces the end portion 502a of the first rectilinear frame 502, and the buffer layer 503c positioned on a frontmost side in the optical axis direction oppositely faces the rear surface 501d of the inwardly directed flange portion 501c of the second decoration frame 501.

The light shielding layer 503a and the support layer 503b are bonded to each other by a first bonding layer 503d. The support layer 503b and the buffer layer 503c are bonded to each other by a second bonding layer 503e. Thus, the light shielding layer 503a is bonded to a surface of the support layer 503b on a rear side in the optical axis direction with the first bonding layer 503d interposed therebetween, and the buffer layer 503c is connected to a surface of the support layer 503b on a front side in the optical axis direction with the second bonding layer 503e interposed therebetween. The first and second bonding layers 503d and 503e may be made of an adhesive agent or may be formed of a sheet which is provided with a layer made of an adhesive agent on both surfaces thereof.

As shown in FIG. 7, the light shielding layer 503a has an endless ring shape and has a fixed width. The light shielding layer 503a is slidably fitted on the outer peripheral surface 101d of the first decoration frame 101. As shown in FIG. 6, the light shielding layer 503a closes the gap G2 extending in the radial direction between the first rectilinear unit 500 and the first lens unit 100. A harmful light which intends to enter the inside of the lens barrel 1 from the gap G2 is blocked by the light shielding layer 503a.

Figure 10A:
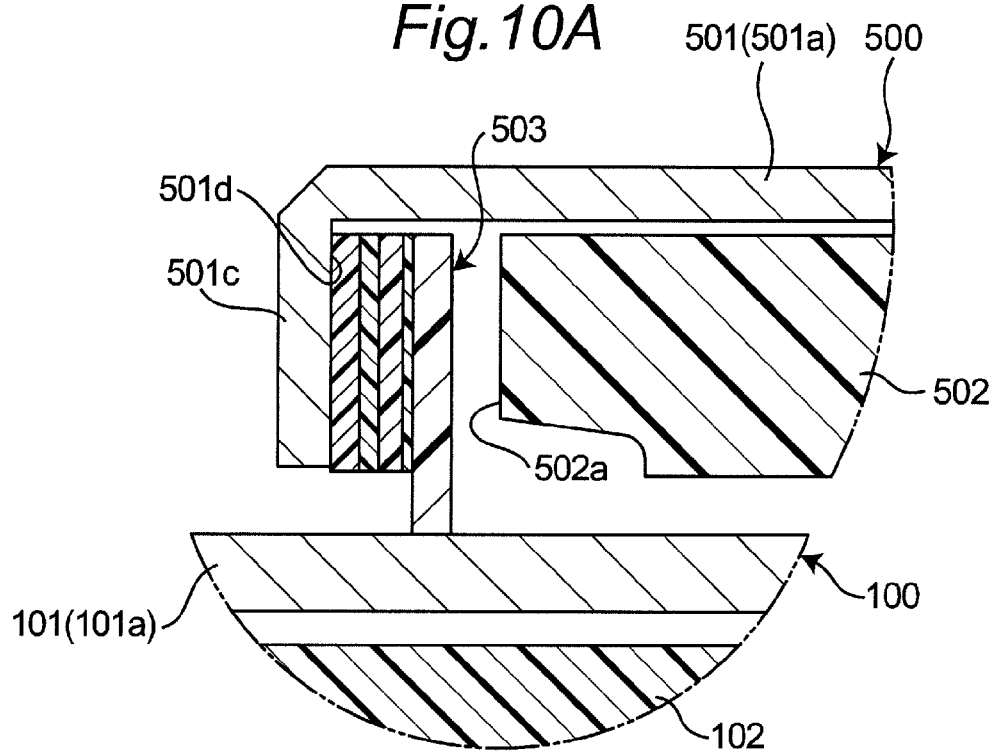
FIG. 10A is an enlarged cross-sectional view similar to FIG. 6 showing a state where the light shielding member abuts with an inwardly directed flange portion of a second decoration frame.
Figure 10B:
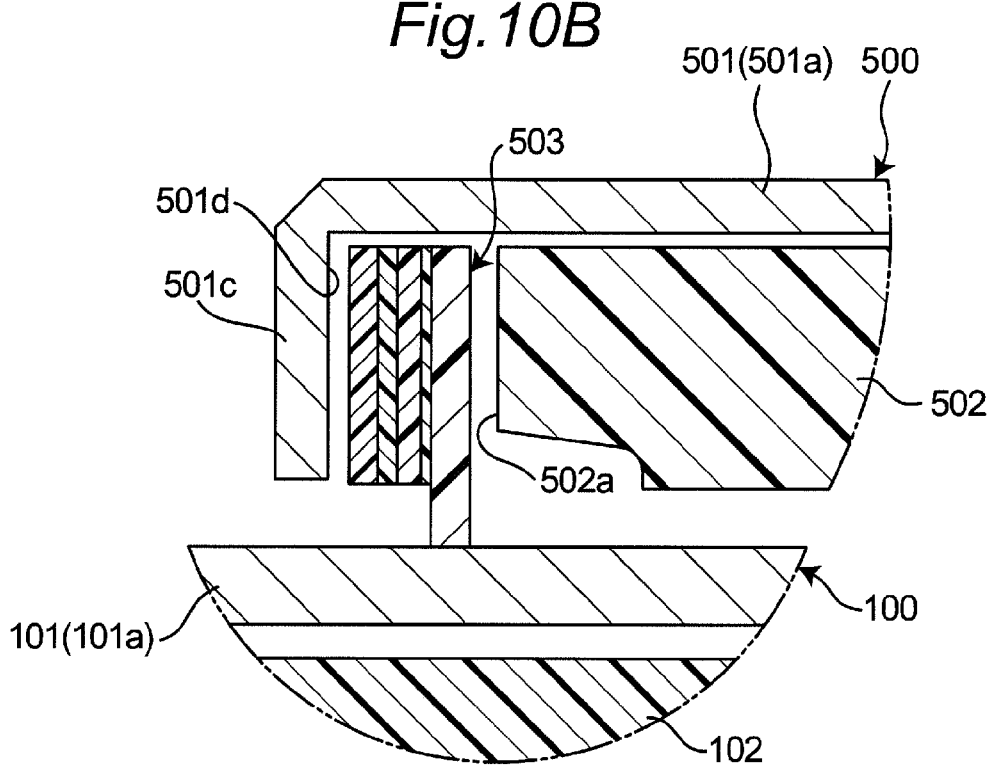
FIG. 10B is an enlarged cross-sectional view similar to FIG. 6 showing a state where the light shielding member is positioned between an end portion of a first rectilinear frame and the inwardly directed flange portion of the second decoration frame.

An inner diameter of the light shielding layer 503a is set equal to an outer diameter of the first decoration frame 101 or is set slightly smaller than the outer diameter of the first decoration frame 101. Therefore, an inner peripheral edge 503f of the light shielding layer 503a is substantially closely contacted to the outer peripheral surface 101d with deforming outward in the radial direction. Accordingly, the light shielding layer 503a is preferably made of a material with relatively low rigidity, that is, a material having low hardness and a small elastic modulus. This can suppress increasing of a contact friction load between the inner peripheral edge 503f and the outer peripheral surface 101d even when the inner peripheral edge 503f of the light shielding layer 503a is closely contacted with the outer peripheral surface 101d of the first decoration frame 101, thereby increasing crossness degree. On the other hand, an outer diameter of the light shielding layer 503a is set such that an outer peripheral edge 503g of the light shielding layer 503a oppositely faces an inner peripheral surface 501e of the cylindrical portion 501a of the second decoration frame 501 with a gap. Accordingly, when the first lens unit 100 moves rectilinearly in the optical axis direction relative to the first rectilinear unit 500, due to the contact friction between an inner peripheral edge 503f of the light shielding layer 503a and the outer peripheral surface 101d of the first decoration frame 101, the light shielding member 503 moves in the optical axis direction together with the first lens unit 100. Specifically, the light shielding member 503 moves between the position at which the light shielding member 503 is brought into contact with the end portion 502a of the first rectilinear frame 502 as shown in FIG. 6 and the position at which the light shielding member 503 is brought into contact with the inwardly directed flange portion 501c of the second decoration frame 501 as shown in FIG. 10A. Depending on the position of the first lens unit 100 relative to the first rectilinear unit 500 in the optical axis direction, as shown in FIG. 10B, the light shielding member 503 is positioned between the end portion 502a of the first rectilinear frame 502 and the inwardly directed flange portion 501c of the second decoration frame 501.

As shown in FIG. 6, there may be a case where the first lens unit 100 further moves rearward in the optical axis direction (toward a right side in FIG. 6) in a state where the light shielding member 503 is brought into contact with the end portion 502a of the first rectilinear frame 502 (at the time of storing the first lens unit 100). In this case, the outer peripheral surface 101d of the first decoration frame 101 moves while maintaining a contact state with the inner peripheral edge 503f of the light shielding layer 503a or while being intermittently brought into contact with the inner peripheral edge 503f of the light shielding layer 503a. Accordingly, a state where the light shielding member 503 is brought into contact with the end portion 502a of the first rectilinear frame 502 is maintained.

As shown in FIG. 10A, there may be a case where the first lens unit 100 further moves frontward in the optical axis direction (toward a left side in FIG. 10A) in a state where the light shielding member 503 is brought into contact with the inwardly directed flange portion 501c of the second decoration frame 501 (at the time of extending the first lens unit 100). Also in this case, the outer peripheral surface 101d of the first decoration frame 101 moves while maintaining a contact state with the inner peripheral edge 503f of the light shielding layer 503a or while being intermittently brought into contact with the inner peripheral edge 503f of the light shielding layer 503a. Accordingly, the light shielding member 503 is maintained in a state where the light shielding member 503 is brought into contact with the inwardly directed flange portion 501c of the second decoration frame 501.

In this embodiment, the light shielding layer 503a is constituted by forming a layer with non-transparent property or light shielding property on a film made of polyethylene terephthalate (PET).

With reference to FIGS. 6 to 9, the support layer 503b includes a body 503h and two slits 503i which are one example of a low-rigidity portion. The body 503h of the support layer 503b has a shape formed by substantially dividing a ring into two parts and has a fixed width. A thickness of the body 503h is sufficiently smaller than a width of the body 503h. In other words, the body 503h of the support layer 503b has a two-divided ring shape with a small thickness. An inner diameter of the body 503h of the support layer 503b is set sufficiently larger than the outer diameter of the first decoration frame 101. Thus, an inner peripheral edge of the body 503h of the support layer 503b oppositely faces the outer peripheral surface 101d of the first decoration frame 101 with a sufficiently large gap therebetween and maintains a non-contact state with the outer peripheral surface 101d of the first decoration frame 101.

The support layer 503b is provided for ensuring the rigidity of the whole light shielding member 503. Accordingly, the body 503h of the support layer 503b is made of a material having a high rigidity, that is, a hard material with a large elastic modulus. Particularly, a material having higher rigidity and a larger elastic modulus than those of a material for forming the light shielding layer 503a and a material for forming the buffer layer 503c is preferably used as a material for forming the body 503h of the support layer 503b. This is because that insufficient rigidity of the light shielding member 503 can cause the light shielding layer 503a to be dragged out from the second decoration frame 501 along with the first lens unit 100 when the first lens unit 100 moves relative to the first rectilinear unit 500 in the optical axis direction. Forming the support layer 503b by the material with high rigidity, that is, by the hard material having the large elastic modulus can prevent the dragging out of the light shielding layer 503a from the second decoration frame 501 along with the first lens unit 100. In this embodiment, the body 503h of the support layer 503b is made of a PET (Poly-Ethylene-Terephthahlate) resin. Besides PET, a material having an elastic modulus of approximately 1.0 to 500.0 GPa such as PC (Polycarbonate), PS (Polystyrene), nylon, acrylic, polyimide, an aluminum alloy, iron or stainless steel can be used as a material for forming the support layer 503b.

As shown in FIG. 8 most clearly, the slit 503i is formed in two portions of the body 503h of the support layer 503b which are symmetrical with respect to a center of the body 503h when the body 503h is viewed in the optical axis direction. The body 503h is divided at portions where the slit 503i is formed.

With reference to FIGS. 6, 7, and 9, the buffer layer 503c has an endless ring shape and has a fixed width. A thickness of the buffer layer 503c is sufficiently smaller than a width of the buffer layer 503c. In other words, the buffer layer 503c has an endless ring shape with a small thickness. An inner diameter of the buffer layer 503c is set sufficiently larger than the outer diameter of the first decoration frame 101. Thus, an inner peripheral edge of the buffer layer 503c oppositely faces the outer peripheral surface 101d of the first decoration frame 101 with a sufficient gap therebetween, and maintains a non-contact state where an inner peripheral edge of the buffer layer 503c is not brought into contact with the outer peripheral surface 101d of the first decoration frame 101. It should be noted that although the inner peripheral edge of the buffer layer 503c oppositely faces the outer peripheral surface 101d of the first decoration frame 101, other arrangement can be applied. Similarly to the light shielding layer 503a, the inner peripheral edge of the buffer layer 503c can maintain a contact state with or be intermittently brought into contact with the outer peripheral surface 101d of the first decoration frame 101. In such cases, an amount of the blocked harmful light intending to enter the lens barrel 1 through the gap G2 is increased.

When the first lens unit 100 moves frontward in the optical axis direction relative to the first rectilinear unit 500, the light shielding member 503 is brought into contact with the rear surface 501d of the inwardly directed flange portion 501c of the second decoration frame 501. The buffer layer 503c is provided for absorbing or buffering an impact generated when the light shielding member 503 is brought into contact with the inwardly directed flange portion 501c as well as vibrations caused by such an impact. Accordingly, the buffer layer 503c is made of a material having a low rigidity, that is, a soft material having a small elastic modulus and a relatively high viscosity. In this embodiment, the buffer layer 503c is manufactured using neoprene rubber. Besides the neoprene rubber, a material having an elastic modulus of approximately 0.001 to 0.2 GPa and having a relatively high viscosity such as other rubbers, elastomer, foamed urethane, or foamed polymer can be used as material for manufacturing the buffer layer 503c.

Assuming that the light shielding member 503 does not include the buffer layer 503c, when the first lens unit 100 moves frontward in the optical axis direction relative to the first rectilinear unit 500, the support layer 503b is brought into contact with the inwardly directed flange portion 501c. In this case, because the support layer 503b is made of a material having a high rigidity, that is, a hard material having with a large elastic modulus as described previously, the light shielding member 503 suffers from a small effect of suppressing an impact generated when the support layer 503b is brought into contact with the inwardly directed flange portion 501c and of suppressing vibrations caused by such an impact (small damper effect). As a result, noises are easily to be generated due to vibrations of the light shielding member 503. Contrarily to this, in this embodiment, because the buffer layer 503c made of a material having a small elastic modulus and high viscosity is brought into contact with the rear surface 501d of the inwardly directed flange portion 501c as described above, a damper effect of suppressing vibrations can be acquired whereby noises caused by vibrations of the light shielding member 503 can be effectively suppressed.

Figure 11:
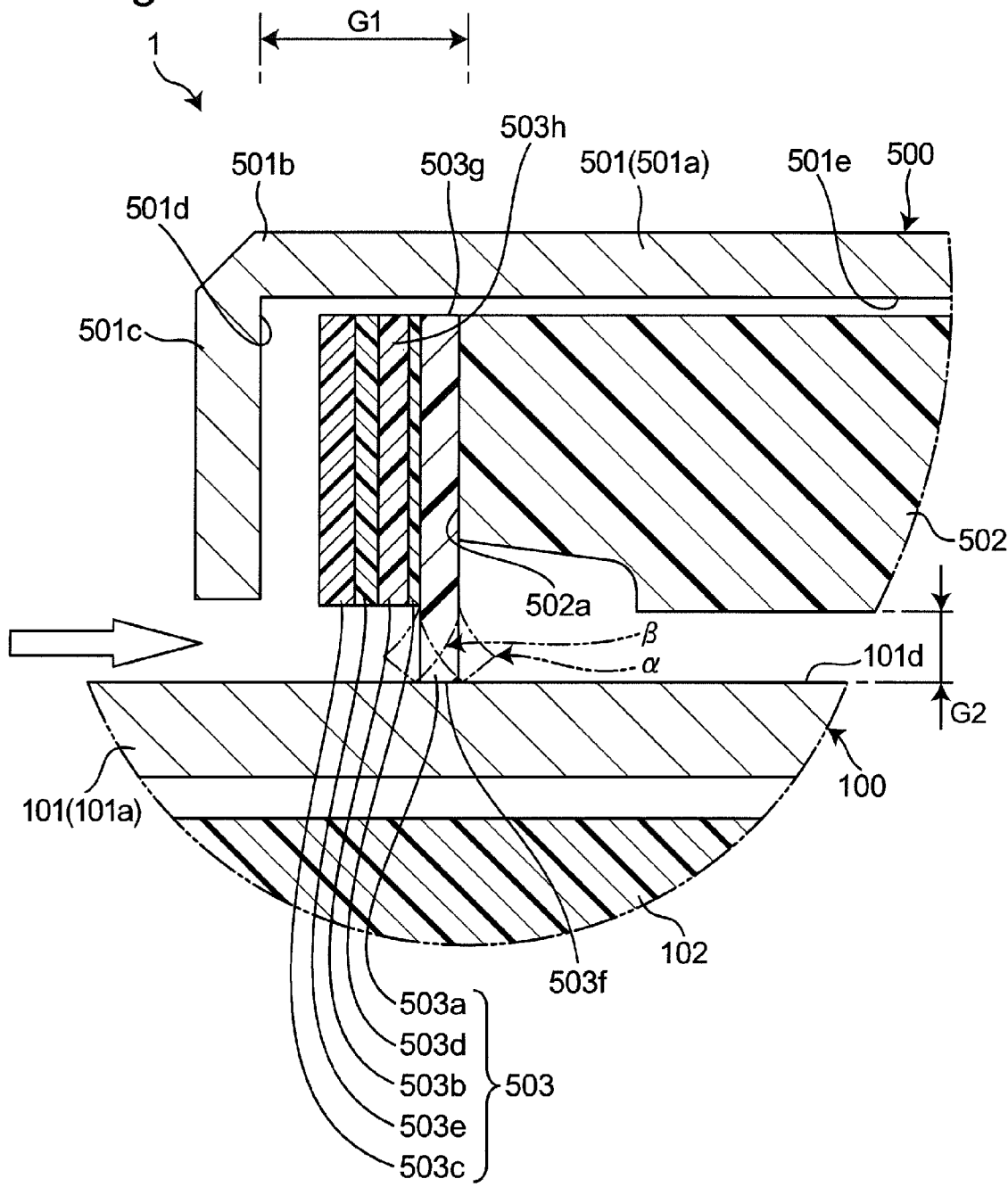
FIG. 11 is an enlarged cross-sectional view similar to FIG. 6 showing a state where the light shielding member is likely to abut with the end portion of the first rectilinear frame.

On the other hand, a conventional light shielding member is a ring member and at least has a light shielding layer made of a material such as rubber material, a bonding layer, and a support layer made of a material such as a PET resin and not having a low rigidity portion such as a slit. These layers are staked form the rear side in the optical axis direction in this order. Because an inner configuration of the light shielding member contacts with an outer configuration of a barrel which is inwardly engaged with the inner configuration of the light shielding member, movement of the barrel can cause vibrations and swinging when a movement direction of the light shielding member is reversed, that is, when transition between a state indicated by a symbol a in FIG. 11 and a state indicated by a symbol β in FIG. 11 is occurred. In the above conventional configuration, abnormal noises can be caused due to the vibrations or the swinging. Particularly, the more larger an outer diameter of the first decoration frame 101 is and the more smaller an inner diameter of the light shielding layer 503a is, by manufacturing size dispersion, the more easily the abnormal noise is generated.

When the first lens unit 100 moves rearward in the optical axis direction relative to the first rectilinear unit 500, the light shielding member 503 is brought into contact with the end portion 502a of the first rectilinear frame 502 of the first rectilinear unit 500 on a front side in the optical axis direction (see FIG. 6). By adopting the light shielding member 503 of this embodiment, noises when the light shielding member 503 is brought into contact with the end portion 502a of the first rectilinear frame 502 can be effectively suppressed. The reason the noises can be effectively suppressed is explained hereinafter.

Assuming that the slits 503i are not formed in the support layer 503b of the light shielding member 503, the rigidity of the light shielding member 503 is excessively increased. In other words, the level of the rigidity of the light shielding member 503, that is, the level of the rigidity substantially determined by the support layer 503b, is sufficient as long as the light shielding layer 503 is not dragged out from the second decoration frame 501 along with the first lens unit 100. However, in case that the slit 503i is not formed in the support layer 503b of the light shielding member 503, the rigidity exceeds such level. Therefore, when the light shielding member 503 is brought into contact with the end portion 502a of the first rectilinear frame 502 on a front side in the optical axis direction, as indicated by the symbol a in FIG. 11, due to a contact friction between the inner peripheral edge 503f of the light shielding layer 503a and the outer peripheral surface 101d of the cylindrical portion 101a of the first decoration frame 101, an inner peripheral side of the light shielding layer 503a is elastically deflected rearward in the optical axis direction. The inner peripheral side of the light shielding layer 503a which is elastically deflected rearward in the optical axis direction is elastically deflected frontward in the optical axis direction immediately as indicated by the symbol β in FIG. 11 due to elasticity which the light shielding layer 503a per se possesses. Since the inner peripheral side of the light shielding layer 503a is instantaneously and continuously deflected rearward and frontward in the optical axis direction, that is, revised as described above, the light shielding layer 503a collides with the end portion 502a of the first rectilinear frame 502. The light shielding member 503 vibrates due to an impact generated at the time of such collision and hence, noises are liable to be generated.

Contrarily to this, in this embodiment, the low rigidity portion such as the slits 503i is formed in the support layer 503 so that the rigidity of the support layer 503b is adjusted such that the rigidity of the support layer 503b is not excessively increased. Accordingly, it is possible to prevent the phenomenon that, when the light shielding member 503 is brought into contact with the end portion 502a of the first rectilinear frame 502, the inner peripheral side of the light shielding layer 503a is deflected and is brought into contact with the end portion 502a. Even in case that the low rigidity portion such as the slit 503i in the support layer 503b of the light shielding member 503, the level of rigidity necessary for preventing the light shielding layer 503a from being dragged out from the second decoration frame can be maintained. The low rigidity portion such as the slit 503i formed in the support layer 503b of the light shielding member 503 allows the light shielding member 503 to easily expand in the radial direction. In other words, the low rigidity portion such as the slit 503i formed in the support layer 503b of the light shielding member 503 decreases a force necessary for the expansion of the light shielding member 503 in the radial direction, resulting in that the contact friction load between the inner peripheral edge 503f of the light shielding layer 503a and the outer peripheral surface 101d of the first decoration frame 101 is suppressed even in case of that the inner peripheral edge 503f of the light shielding layer 503a and the outer peripheral surface 101d of the first decoration frame 101 are closely contacted with each other. The equilibrium between the force that outwardly expands the light shielding member and a restorative fore that tends to restore the light shielding member to the original shape stabilizes the contact condition between the first light shielding member 503 and the first decoration frame 101. Thus, even in case of large manufacturing size dispersion, generation of noises can be suppressed. As a result, it is possible to effectively suppress the generation of vibrations of the light shielding member 503 caused by the collision of the light shielding layer 503a with the end portion 502a of the first rectilinear frame 502 and the generation of noises caused by such vibrations.

In case that the support layer 503b is made of a material with low rigidity, that is, a soft material with small elastic modulus similar to a material for forming the buffer layer 503c as described above, there exists the following problem. It is assumed a state where the light shielding member 503 is brought into contact with the inwardly directed flange portion 501c of the second decoration frame 501 as shown in FIG. 10A. In this state, when the first lens unit 100 moves frontward in the optical axis direction relative to the first rectilinear unit 500, due to the insufficient rigidity of the light shielding member 503, the light shielding layer 503a is dragged out to the outside of the second decoration frame 501 along with the first lens unit 100.

Contrarily to this, the support layer 503 of this embodiment ensures the required rigidity for preventing the dragging out of the support layer 503 although the rigidity is adjusted by forming the slits 503i in the support layer 503b. Accordingly, there is no possibility that light shielding layer 503a is dragged out from the second decoration frame 501 along with the first lens unit 100.

As has been explained heretofore, by forming the slits 503i in the support layer 503b, it is possible to surely prevent the light shielding layer 503a from being pulled out to the outside of the second decoration frame 501 while effectively suppressing the generation of noises.

FIGS. 12 to 15 show alternatives of the support layer 503b. A support layer 503b shown in FIG. 12 includes a single slit 503i. A support layer 503b shown in FIG. 13 includes three slits 503*i* which are arranged at equal angular intervals with respect to the center of the support layer 503*b* as viewed in the optical axis direction. Three or more slits may be formed on the support layer 503*b*.

Figure 14:
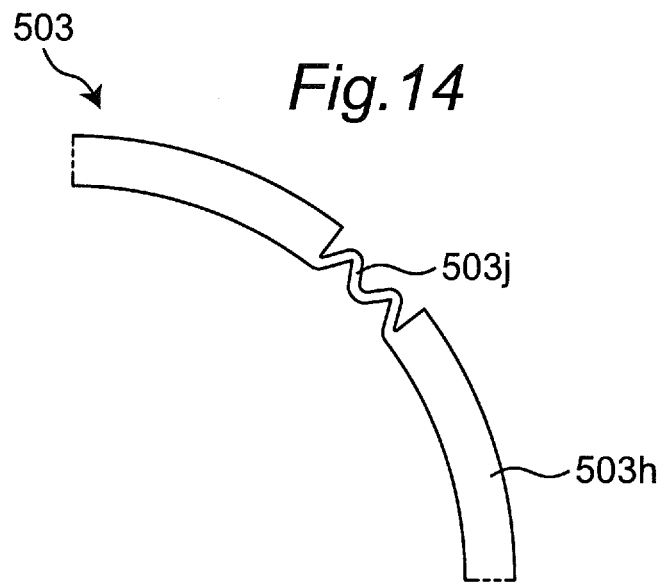
FIG. 14 is a partially enlarged front view of a third alternative of the support layer.
Figure 15:
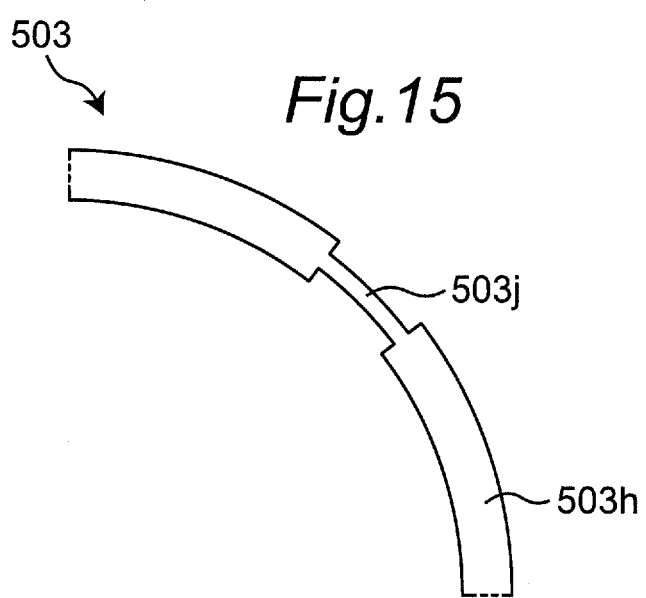
FIG. 15 is a partially enlarged front view of a fourth alternative of the support layer.

Each of the support layers 503*b* shown in FIGS. 14 and 15 includes, in place of the slit, a narrow width portion 503*j* where a width of a portion of a body 503*h* of the support layer 503 is set smaller than widths of other portions of the body 503*h* of the support layer 503. In FIG. 14, the narrow width portion 503*j* has a meandering shape. In FIG. 15, the narrow width portion 503*j* has a circular-arcuate shape and has the center in common with the body 503*h*. The narrow width portion 503*j* functions as the low rigidity portion and thereby achieves similar effects as those of the slit. Further, although not illustrated, in place of the slit, it can be provided a thin thickness portion at which the thickness in the optical axis direction of the body 503*h* of the support layer 503 is partially set to smaller than that of the other portion of the body 503*h*. Such structure can also achieve similar effects.

Figure 16:
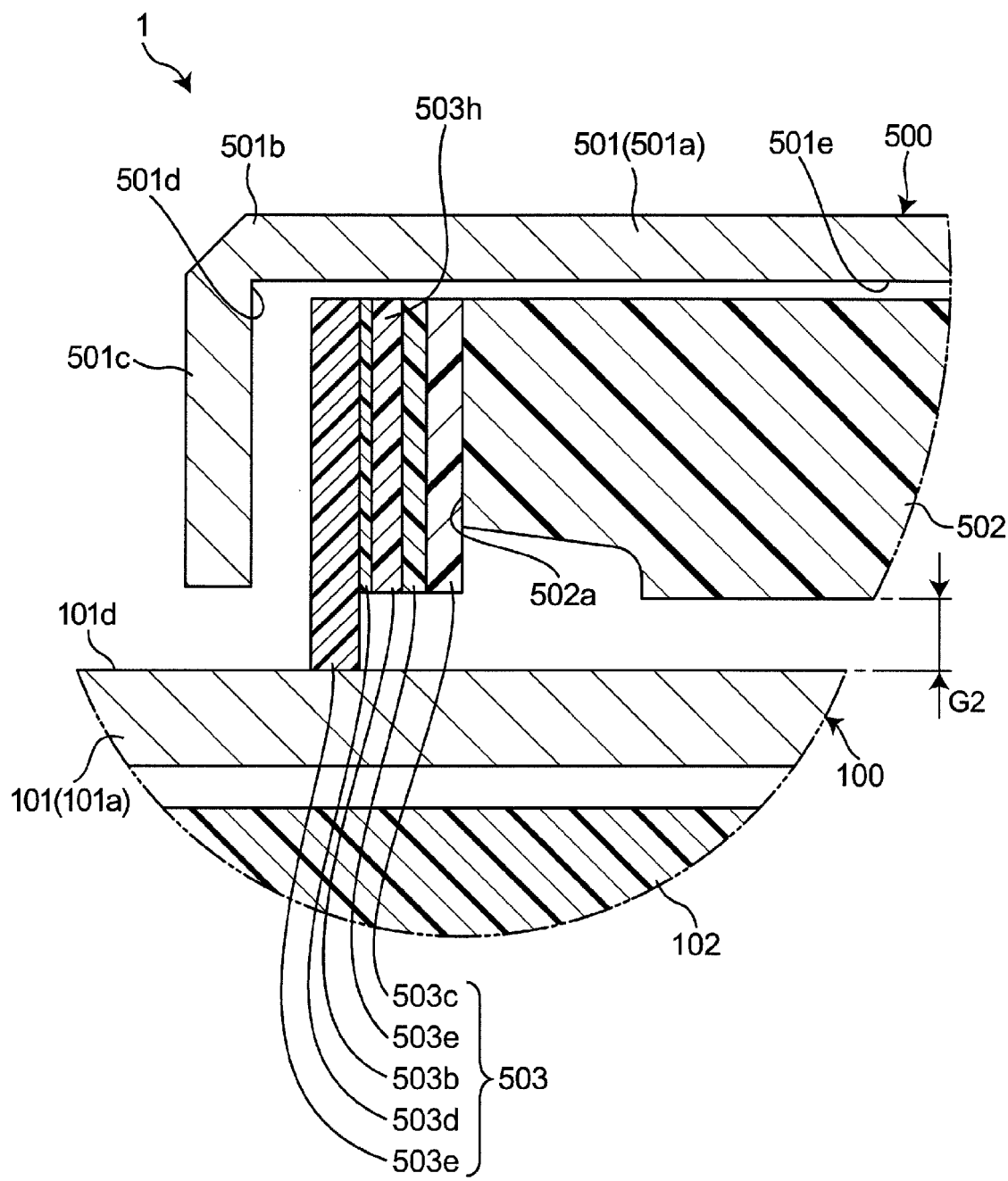
FIG. 16 is an enlarged cross-sectional view similar to FIG. 6 showing an alternative of the light shielding member.

FIG. 16 shows an alternative of the light shielding member 503. In this light shielding member 503, a buffer layer 503*c*, a support layer 503*b*, and a light shielding layer 503*a* are arranged in this order in the direction from an end portion 502*a* of a first rectilinear frame 502 on the front side in the optical axis direction toward a front side in the optical axis direction. Accordingly, the buffer layer 503*c* positioned on a rearmost side in the optical axis direction oppositely faces an end portion 502*a* of the first rectilinear frame 502, and the light shielding layer 503*a* positioned on a frontmost side in the optical axis direction faces the inwardly directed flange portion 501*c* of a second decoration frame 501. Such structure can also achieve similar effects.

A material for forming the light shielding layer 503*a* may be equal to a material for forming the buffer layer 503*c*. Thus, as a material for forming the light shielding layer 503*a*, it is possible to use a material having an elastic modulus of approximately 0.001 to 0.2 GPa and having a relatively high viscosity such as rubber represented by neoprene rubber, elastomer, foamed urethane, or foamed polymer.

Although the present disclosure has been fully described in connection with the preferred embodiments thereof with reference to the accompanying drawings, it is to be noted that various changes and modifications are apparent to those skilled in the art. Such changes and modifications are to be understood as included within the scope defined by the appended claims unless they depart therefrom.

What is claimed is:

1. A lens barrel comprising:
a first barrel portion;
a second barrel portion which is arranged inside the first barrel portion and is movable in an optical axis direction relative to the first barrel portion; and
a light shielding member for light shielding between the first barrel portion and the second barrel portion,
wherein the light shielding member comprises:
a light shielding layer with an endless ring shape which is slidably fitted on the second barrel portion and closes a gap defined between the first barrel portion and the second barrel portion and extending in a direction orthogonal to the optical axis direction;
a support layer including a body with a shape corresponding to that of the light shielding layer bonded to the light shielding layer and at least one low rigidity portion having rigidity lower than that of the body; and
a buffer layer bonded to a side of the support layer opposite to the light shielding layer.

2. The lens barrel according to claim 1, wherein the low rigidity portion is a slit which divides the support layer into a plurality of the bodies.

3. The lens barrel according to claim 1, wherein the low rigidity portion is a narrow width portion having a width narrower than that of the body.

4. The lens barrel according to claim 3, wherein the narrow width portion has a meandering shape.

5. The lens barrel according to claim 1, wherein the narrow width portion has a thickness smaller than that of the body.

6. The lens barrel according to claim 1, wherein the first barrel portion includes:
a first cylindrical frame; and
a first outer frame including:
a cylindrical body which is fixed to the first cylindrical frame, surrounds an outer periphery of the first cylindrical frame, and has a front-side end portion in the optical axis direction, the front-side end portion being positioned in front of a front-side end portion of the first cylindrical frame in the optical axis direction in the optical axis direction; and
an inwardly directed flange portion which projects inwardly from the front-side end portion of the cylindrical body in the optical axis direction,
wherein the light shielding member is arranged in a gap in the optical axis direction defined between the front-side end portion of the first cylindrical frame and the inwardly directed flange portion.

7. The lens barrel according to claim 6, wherein the second barrel portion includes:
a second cylindrical frame; and
a second outer frame which is fixed to the second cylindrical frame and surrounds an outer periphery of the second cylindrical frame,
wherein the light shielding layer of the light shielding member is fitted on the second outer frame.

8. The lens barrel according to claim 7, wherein the second barrel portion is a lens unit for holding a lens on a side closest to an object to be imaged, and
wherein the first barrel portion is a rectilinear unit arranged outside the lens unit.

9. The lens barrel according to claim 8, wherein the first cylindrical frame is a rectilinear frame and the first outer frame is a decoration frame for the rectilinear frame, and
wherein the second cylindrical frame is a lens frame for holding the lens and the second outer frame is a decoration frame for the lens frame.

10. The lens barrel according to claim 9, wherein the light shielding layer, the support layer, and the buffer layer are arranged in this order from the rectilinear frame toward the inwardly directed flange portion.

11. The lens barrel according to claim 9, wherein the buffer layer, the support layer, and the light shielding layer are arranged in this order from the rectilinear frame toward the inwardly directed flange portion.

12. A lens barrel comprising:
a first barrel portion;
a second barrel portion which is arranged inside the first barrel portion and is movable in an optical axis direction relative to the first barrel portion; and
a light shielding member for light shielding between the first barrel portion and the second barrel portion,
wherein the light shielding member comprises:
a light shielding layer with an endless ring shape which is slidably fitted on the second barrel portion and closes a gap defined between the first barrel portion and the second barrel portion and extending in a direction orthogonal to the optical axis direction; and a support layer including a body with a shape corresponding to that of the light shielding layer bonded to the light shielding layer and at least one low rigidity portion having rigidity lower than that of the body, wherein the low rigidity portion is a narrow width portion having a width narrower than that of the body, and wherein the narrow width portion has a meandering shape.

13. A lens barrel comprising:

a first barrel portion;

a second barrel portion which is arranged inside of the first barrel portion and is movable in an optical axis direction relative to the first barrel portion; and a light shielding member for light shielding between the first barrel portion and the second barrel portion, wherein the light shielding member comprises:

a light shielding layer which is slidably fitted on the second barrel portion and closes a gap defined between the first barrel portion and the second barrel portion and extending in a direction orthogonal to the optical axis direction;

a support layer which is bonded to the light shielding layer and has a shape corresponding to that of the light shielding layer; and a buffer layer bonded to a side of the support layer opposite to the light shielding layer.

14. The lens barrel according to claim 13, wherein elastic modulus of the light shielding layer and the buffer layer is smaller than that of the support layer.

* * * * *